Patented Mar. 14, 1944

2,344,194

UNITED STATES PATENT OFFICE

2,344,194
ROSIN BASE RESIN

Gilbert R. Anderson, Elsmere, Del., assignor to Hercules Powder Company, Wilmington, Del., a corporation of Delaware No Drawing. Application April 22, 1941,
Serial No. 389,733

19 Claims. (Cl. 260—26)

This invention relates to resins comprising rosin or modified rosin as the basic ingredient. More particularly, it relates to resinous materials comprising an esterification product of a polypentaerythritol with rosin acids or modified rosin acids with an alpha-beta unsaturated polybasic acid, and a method for preparing the same.

It has heretofore been known to produce resins of very desirable properties, such as the glycerol esters of rosin-maleic anhydride and rosin esters of pentaerythritol, etc., using rosin as the basic ingredient. However, for one reason or another such resins have not been entirely satisfactory for many purposes.

It is an object of this invention to provide new rosin base resins of improved characteristics.

A further object of this invention is to provide resins improved in certain characteristics such as heat stability and hardness, and having other characteristics capable of wide variation to fit special uses at hand.

A further object of this invention is to provide a simple and economical method for preparing the new compositions.

Other objects of this invention will appear hereinafter.

The objects of this invention are broadly accomplished by contacting a rosin acid or modified rosin acid with an alpha-beta unsaturated polybasic acid and polypentaerythritol at suitable temperatures to cause the formation of a resin comprising an esterification product of a polypentaerythritol with a rosin acid and an apha-beta unsaturated polybasic acid.

The new resinous materials of this invention have many advantages over other resinous materials and possess many useful properties. The new resins of the invention are largely comprised of rosin or its modifications and hence are relatively inexpensive. However, the new resins do not possess many of the disadvantages of the known resins primarily based on rosin. The resinous materials of this invention have extremely high melting points, and are very hard, and are particularly stable at high temperatures. Furthermore, as will be later described, the properties of the new resins may be varied over a wide range so that resinous materials "tailor made" for specific purposes may be produced. As a specific example of one important use of such a resin, the use of an oil-soluble resinous material in the preparation of valuable varnishes from "soft oils" such as linseed oil may be cited.

The alcohols reacting to form the esterification products comprising the resins of this invention, and herein referred to as "polypentaerythritols," are dipentaerythritol and other polypentaerythritols which are of higher order than pentaerythritol and which may be formed along with pentaerythritol in certain methods of carrying out the reaction of acetaldehyde with formaldehyde in the presence of an alkaline catalyst such as calcium hydroxide. This reaction is usually carried out for the purpose of producing pentaerythritol, the polypentaerythritols being formed as byproducts and left after separation of pentaerythritol from the reaction products. However, by proper control of the reaction, increased yields of the polypentaerythritols may be realized. The polypentaerythritols are believed to be the polyethers of pentaerythritol, and in accordance with this theory the di- and tri-pentaerythritols as examples of the polypentaerythritols would have the following theoretical structural formulas:

Dipentaerythritol

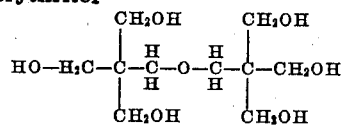

Tripentaerythritol

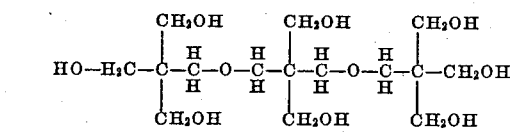

The polypentaerythritols may be separated from the pentaerythritol formed in the acetaldehyde-formaldehyde reaction by any suitable means. Where it is desired to produce the new resins of this invention having exceptionally high melting points with the use of a minimum of relatively expensive alpha-beta unsaturated polybasic acid the dipentaerythritol or the mixture of polypentaerythritols substantially free of pentaerythritol may be used for the esterification. Where the production of resins of such extremely high melting point is not so important, and where very low cost may be essential, the entire pentaerythritol-polypentaerythritol mixture produced in the acetaldehyde-formaldehyde reaction may be used. In this case no separation of the alcohols is necessary, and the compositions resulting from the use of such a mixture according to this invention may have quite high melting points. In general, where mixtures of pentaerythritol and polypentaerythritol are employed in the esterification, the increase in melting point of the resin produced with the alcohol mixture over a corresponding resin produced with the straight pentaerythritol will be roughly proportional to the per cent polypentaerythritol present in the total alcohol mixture employed.

The resinous materials of this invention may be produced with rosin acids comprising any of the rosins or modified rosins or their mixtures. Thus, abietic or isomeric rosin acids or any other rosin acids or their mixtures comprising unmodified rosins such as gum rosin and wood rosin, or modified rosins such as those comprising heat treated rosin, "Hyex" (disproportionated) rosin, hydrogenated rosin or polymerized rosin may be employed according to this invention. The term "rosin acid" as used herein refers to any such rosin acid or modified rosin acid.

The properties of the resin produced according to this invention will depend on the exact chemical nature of the rosin acid or rosin acid mixture employed. Thus, for example, where the thermoplastic type resins are produced and for a given content of alpha-beta unsaturated polybasic acid in the resin, polymerized rosin may yield a resin of highest melting point, gum rosin yielding a resin which may not be as high melting as yielded by some polymerized rosins, and wood rosin, heat treated rosin, disproportionated rosin and hydrogenated rosin generally yielding resins slightly lower in melting point than gum rosin. Where polymerized rosin is employed, the degree of polymerization, or differently stated, the average molecular weight of the polymerized rosin, will affect the melting point of the resin produced, the polymerized rosins of higher average molecular weight forming the higher melting resins.

Any alpha-beta unsaturated polybasic acids including their anhydrides, such as maleic acid or anhydride, fumaric acid, itaconic acid, etc., may be employed according to this invention, and the term "alpha-beta unsaturated polybasic acid" as used herein and in the appended claims is meant to denote any of these acids including their anhydrides, or mixtures of such acids and/or their anhydrides. However, the amount of the acid employed has an important effect on the properties of the resin produced. Thus, depending upon the amount of such acid employed in the resin, it is possible to produce thermoplastic or soluble-fusible type resins of varying melting points and also thermosetting resins. For simplicity the effect of the quantity of such acid employed, on the properties of the resin produced will be discussed in terms of maleic anhydride as this acid. However, the effect of an amount of any of the alpha-beta unsaturated polybasic acids will be very nearly equal to the effect of a molecularly equivalent amount of maleic anhydride.

When maleic anhydride is employed according to this invention, the soluble-fusible type resins may be prepared by maintaining the amount of maleic anhydride below the rather critical limit of about 9% based on the weight of rosin acids employed in the resins. The soluble-fusible resins which may then be prepared by employing a limited amount of maleic anhydride are high melting, hard, stable at high temperatures and may be quite soluble in many solvents including oils such as linseed oil. Their solutions in the relatively volatile solvents are high in viscosity forming films having rapid solvent release, no "after tack," due to small amounts of retained solvents and such as shown by rosin glycerol esters, being exhibited by these new esters. Such resins may be cooked with the "soft oils" such as linseed oil, perilla oil, etc., at extremely high cooking temperatures without discoloration, the cooling mixture bodying very rapidly to form varnishes which yield films having good color, very high hardness, durability, and alkali resistance. Varnishes thus formed may compare very favorably with the expensive tung oil varnishes.

In general, where the thermoplastic or soluble-fusible type resins are produced, the properties of hardness, elevation of melting point, and high heat stability of the resin, and the properties of hardness, alkali resistance, etc., of the soft oil varnishes prepared therefrom are proportional to the amount of the maleic anhydride employed. However, in order to produce the resins markedly improved in those properties over corresponding polypentaerythritol rosin esters not containing any maleic anhydride, it is generally desirable to maintain the amount of maleic anhydride above at least about 1% based on the weight of rosin acid employed in forming the resin. On the other hand, as the amount of maleic anhydride is increased, the solubility and compatibility of the resin produced decreases until complete insolubility in oils and gelling of the resin is obtained above about 9% by weight of maleic anhydride. In order to produce resins having wide compatibility and good solubility in oils, and particularly in the bodied drying oils, it will be desirable to maintain the amount of maleic anhydride employed below about 5% based on the weight of rosin acids employed. The resins produced by employing an amount of maleic anhydride within the preferred range of from about 1% to about 5% combine the advantages of high melting point, and excellent properties of the varnish films formed therefrom with the advantages of good oil solubility and wide compatibility.

When resins are produced in which the amount of maleic anhydride is greater than about 9% by weight based on the weight of rosin acids employed and especially where the low acid number resins are produced, there is a great tendency for gelation with the formation of extremely hard and tough insoluble-infusible type resins on prolonged heating or esterification temperatures. Moreover, the readiness with which such resins are produced increases with increase in the amount of maleic acid employed. However, the esterification reaction may be interrupted before completion, and the compositions thus formed may be soluble in a variety of organic solvents, and these soluble intermediates used in coating compositions, in the impregnation of fillers for molding composition, etc. The properties of great hardness and toughness and the stability of the resin at high temperatures are very valuable in such uses.

As previously pointed out, the effect of an amount of any of the alpha-beta unsaturated polybasic acids will be very closely equal to the effect of a molecularly equivalent amount of maleic anhydride, therefore in producing the thermoplastic or soluble-fusible type resins, the amount of any alpha-beta unsaturated polybasic acid employed will be molecularly equivalent to an amount of maleic anhydride of less than about 9% and preferably from about 1% to about 5% by weight based on the weight of rosin acids employed in the resin. Where the gelled, insoluble-infusible type resins are produced, the amount of alpha-beta unsaturated polybasic acid employed will be molecularly equivalent to an amount of maleic anhydride greater than about 9% by weight based on the weight of rosin acids employed.

In carrying out the esterification, the proportions of the reactants are not particularly critical. However, in order to produce resins of low acid number, it is generally desirable to have present in the reaction mixture at least the theoretical amount of alcohol present to react with the acid radical presented. In general, a slight theoretical excess of alcohols is preferably employed as is illustrated in the examples below.

The resinous composition of this invention may be produced by contacting the rosin acid, the alpha-beta unsaturated polybasic acid and the polypentaerythritol at suitable elevated temperatures. If desired, the reactions may be carried out in a stepwise manner, for example, by contacting the rosin acid and polypentaerythritol separately, partially esterifying the alcohol, then completing the esterification by the addition of alpha-beta unsaturated polybasic acid at suitable temperature, or the reactions may be carried out in one operation by contacting all ingredients together at the elevated temperatures.

The esterification reaction may be carried out at suitable elevated temperatures. The reaction takes place above about 250° C., and much more favorably above 285° C. While the rosin acids or the alpha-beta unsaturated polybasic acids, and the polypentaerythritols are not particularly heat stable, the esters formed from them are extremely heat stable. Hence, in order to form the light colored resins, it is desirable initially to contact these alcohol and acid components of the resin at a temperature as far below the final elevated reaction temperature as possible, and preferably below about 230° C. The temperature may then be raised and, may be maintained above about 250° C. and preferably above about 285° C. for a time sufficient to complete the reaction. The temperature will, however, preferably be maintained below about 315° C. to avoid darkening. If desired, the esterification may be carried out in the presence of suitable esterification catalysts such as boric acid or zinc powder. In such case, lower esterification temperatures are possible, and temperatures as low as 240° C. or lower may be feasible.

No fixed time necessary for the reactions may be given since they may vary with the temperatures employed, the exact chemical nature of the particular reactants employed, the final composition of the resin desired, etc. However, the examples below will serve to indicate the time which may be necessary in a given case.

During the reactions, and wherever the resin or its component materials may be exposed to high temperatures, it is very desirable to use an inert atmosphere such as $N_2$ or $CO_2$ thus preventing darkening due to atmospheric oxidation.

After the reaction period, the resin produced may be sparged to remove impurities. In the sparging operation any inert gas such as steam, $N_2$ or $CO_2$ is swept through the resin at elevated temperatures, thus removing such slightly volatile impurities as polypentaerythritols, rosin oils, etc. Vacuum distillation or vacuum distillation in combination with sparging may likewise be used to remove such volatile impurities.

The following examples will serve to illustrate the new resins of this invention and the method for producing the same.

*Example I*

One hundred parts by weight of wood rosin were heated to a temperature just above its melting point, and 3.5 parts by weight of maleic anhydride were added at this temperature. The mixture was gradually heated over a one-hour period to 230° C., and the temperature maintained at this temperature for an additional hour. This mixture was then cooled to 210° C., and 13.5 parts by weight of a crude pentaerythritol-polypentaerythritol mixture containing approximately 25% polypentaerythritol was added to it. This mixture was then heated gradually to 290° C. over a one-half hour period, then maintained at this temperature for 12 hours. The reactions were carried out in a vessel fitted with a steam condenser arranged to permit the escape of water formed in the esterification and to prevent the escape of pentaerythritol and polypentaerythritols. During the operations at high temperatures, the reaction mixtures were blanketed with $CO_2$ by passing a slow stream of $CO_2$ into the reaction mixture. After the reactions were substantially completed, the resinous composition was sparged for one hour with $CO_2$ at 290° C. The composition had an acid number of 15, a drop melting point of 140° C. and a color of 32 Amber Lovibond scale or N+ Standard U. S. Rosin Type. This resin was readily soluble in linseed oil.

*Example II*

100 parts by weight of wood rosin and 3.5 parts by weight of maleic anhydride were heated with 16.5 parts by weight of dipentaerythritol, the temperature being brought gradually to 290° C. over a one-half hour period. This mixture was maintained for 12 hours at 295° C. The reactions were carried out in equipment described in the previous example, and likewise under a blanket of $CO_2$. The composition obtained, after the reaction period was purified by sparging for one hour with $CO_2$ at 290° C. The resin obtained had a drop melting point of 180° C., a color of 50A on the Lovibond scale or K+ Standard U. S. Rosin Type, and an acid number of 15. This resin had good solubility in linseed oil.

*Example III*

A polymerized rosin was prepared as follows: A benzene solution containing about 35% by weight of wood rosin color grade I Standard U. S. Rosin Type was treated with 25% of its weight of 95% sulfuric acid and kept at a temperature of 13°–18° C. with stirring for one hour. The reaction mixture was then allowed to stand for 15 minutes, and the benzene solution was decanted from the sludge. The benzene solution was then water washed to remove the acid, and the polymerized rosin recovered from the washed benzene solution by evaporating the solvent. The polymerized rosin prepared had a drop melting point of 100° C., an acid number of 155 and a color grade M Standard U. S. Rosin Type.

100 parts of the above-prepared polymerized rosin was heated to a temperature just above its melting point, and 3.5 parts by weight of maleic anhydride were then added. This mixture was then heated to 225° C. Slowly, over a one-hour period of time, and maintained at this temperature for one hour. This mixture was esterified with 13.5 parts by weight of a crude pentaerythritol-polypentaerythritol mixture containing approximately 25% by weight, dipentaerythritol, the temperature of the esterification being gradually raised to 290° C. from 210° C., and maintained at 290° C. for 12 hours. The reactions were carried out in equipment described in Example I and likewise blanketing the reacting mixtures with $CO_2$. The resin obtained after the reaction period was sparged for one hour with $CO_2$ at 290° C. The final resin had a drop melting point of 150° C., an acid number of 13 and a color grade I+, Standard U. S. Rosin Type. This resin had good solubility in bodied linseed oil.

Example IV 100 parts by weight of the polymerized rosin prepared as in Example III and 3.5 parts by weight of maleic anhydride were esterified as in the previous examples with the exception that dipentaerythritol was employed as the alcohol. The resin obtained had a drop melting point of 163° C., an acid number of 15 and a color of K Standard U. S. Rosin Type. This resin had good solubility in bodied linseed oil.

It will be understood that the details and examples hereinbefore set forth are illustrative only and that the invention as broadly described and claimed is in no way limited thereby.

What I claim and desire to protect by Letters Patent is:

1. A resin comprising a hard, stable, oil-soluble ester of a polypentaerythritol, a rosin acid and an alpha-beta unsaturated polycarboxylic acid, the amount of the said alpha-beta unsaturated polycarboxylic acid employed in the resin being equivalent to an amount of maleic anhydride between about 1% and about 9% by weight of the said rosin acid, and the rosin and polycarboxylic acid groups being substantially completely esterified.

2. A resin comprising a hard, stable, oil-soluble ester of dipentaerythritol, a rosin acid and an alpha-beta unsaturated polycarboxylic acid, the amount of the said alpha-beta unsaturated polycarboxylic acid employed in the resin being equivalent to an amount of maleic anhydride between about 1% and about 9% by weight of the said rosin acid, and the rosin and polycarboxylic acid groups being substantially completely esterfied.

3. A resin comprising a hard, stable, oil-soluble ester of a pentaerythritol-polypentaerythritol mixture, a rosin acid and an alpha-beta unsaturated polycarboxylic acid, the amount of the said alpha-beta unsaturated polycarboxylic acid employed in the resin being equivalent to an amount of maleic anhydride between about 1% and about 9% by weight of the said rosin acid, and the rosin and polycarboxylic acid groups being substantially completely esterified.

4. A process for producing a hard, stable, oil-soluble resin comprising contacting a rosin acid with an alpha-beta unsaturated polycarboxylic acid in a quantity equivalent to maleic anhydride in an amount between about 1% and about 9% of the weight of the rosin acid, and a polypentaerythritol at a suitable temperature and for a period of time to cause substantially complete esterification of the acids with the polypentaerythritol.

5. A process for producing a hard, stable, oil-soluble resin comprising contacting a rosin acid with an alpha-beta unsaturated polycarboxylic acid in a quantity equivalent to maleic anhydride in an amount between about 1% and about 9% of the weight of the rosin acid, and a polypentaerythritol at a temperature within the range of from about 250° C. to about 315° C. and for a period of time to cause substantially complete esterification of the acids with the polypentaerythritol.

6. A process for producing a hard, stable, oil-soluble resin comprising contacting a rosin acid with an alpha-beta unsaturated polycarboxylic acid in a quantity equivalent to maleic anhydride in an amount between about 1% and about 9% of the weight of the rosin acid, and a polypentaerythritol at temperatures below about 230° C., slowly increasing the temperature to a temperature within the range of about 285° C. to about 315° C., and maintaining the temperature within this range for a period of time to cause substantially complete esterification of the acids with the polypentaerythritol.

7. A hard, stable, oil-soluble rosin product consisting essentially of an ester of rosin acids, an alpha-beta unsaturated polycarboxylic acid, and a polypentaerythritol, in which the amount of the alpha-beta unsaturated polycarboxylic acid is equivalent to an amount of maleic anhydride between about 1% and about 5% by weight of the rosin acids, and the rosin and alpha-beta unsaturated polycarboxylic acid groups are substantially completely esterified.

8. A hard, stable, oil-soluble rosin product consisting essentially of an ester of rosin acids, maleic acid, and a polypentaerythritol, in which the amount of maleic acid is equivalent to an amount of maleic anhydride between about 1% and about 5% by weight of the rosin acids, and the rosin and maleic acid groups are substantially completely esterified.

9. A hard, stable, oil-soluble rosin product consisting essentially of an ester of an unmodified rosin, maleic acid, and a polypentaerythritol, in which the amount of maleic acid is equivalent to an amount of maleic anhydride between about 1% and about 5% by weight of the acids in the rosin, and the rosin and maleic acid groups are substantially completely esterified.

10. A hard, stable, oil-soluble rosin product consisting essentially of an ester of polymerized rosin, maleic acid, and a polypentaerythritol, in which the amount of maleic acid is equivalent to an amount of maleic anhydride between about 1% and about 5% by weight of the acids in the polymerized rosin, and the said rosin and maleic acid groups are substantially completely esterified.

11. A hard, stable, oil-soluble rosin product consisting essentially of an ester of hydrogenated rosin, maleic acid, and a polypentaerythritol, in which the amount of maleic acid is equivalent to an amount of maleic anhydride between about 1% and about 5% by weight of the acids in the hydrogenated rosin, and the said rosin and maleic acid groups are substantially completely esterified.

12. A hard, stable, oil-soluble rosin product consisting essentially of an ester of rosin, an alpha-beta unsaturated polycarboxylic acid, and polypentaerythritols, in which the alpha-beta unsaturated polycarboxylic acid is in an amount equivalent to a quantity of maleic anhydride between about 1% and about 9% by weight of the rosin acid in the ester, and the rosin and polycarboxylic acid groups are substantially completely esterified.

13. A hard, stable, oil-soluble rosin product consisting essentially of an ester of rosin, maleic acid, and a polypentaerythritol-pentaerythritol mixture, in which the maleic acid is in an amount equivalent to a quantity of maleic anhydride between about 1% and about 9% by weight of the rosin acid in the ester, and the rosin and maleic acid groups are substantially completely esterified.

14. A resin comprising a hard, stable, oil-soluble ester of a polypentaerythritol, a rosin acid and maleic acid, the amount of maleic acid employed in the resin being equivalent to a quantity of maleic anhydride between about 1% and about 9% by weight based on the weight of the rosin acid, and the rosin and maleic acid groups being substantially completely esterified.

15. A resin comprising a hard, stable, oil-soluble ester of dipentaerythritol, a rosin acid and maleic acid, the amount of maleic acid employed in the resin being equivalent to a quantity of maleic anhydride between about 1% and about 9% by weight based on the weight of the rosin acid, and the rosin and maleic acid groups being substantially completely esterified.

16. A resin comprising a hard, stable, oil-soluble ester of a pentaerythritol-polypentaerythritol mixture, a rosin acid and maleic acid, the amount of maleic acid employed in the resin being equivalent to a quantity of maleic anhydride between about 1% and about 9% by weight based on the weight of the rosin acid, and the rosin and maleic acid groups being substantially completely esterified.

17. A resin comprising a hard, stable, oil-soluble ester of a pentaerythritol-polypentaerythritol mixture, polymerized rosin and maleic acid, the amount of maleic acid employed in the resin being equivalent to a quantity of maleic anhydride between about 1% and about 9% by weight based on the weight of the acids in the polymerized rosin, and the polymerized rosin and maleic acid groups being substantially completely esterified.

18. A resin comprising a hard, stable, oil-soluble ester of a mixture of polypentaerythritols with pentaerythritol in which the quantity of polypentaerythritols is about 25% by weight of the said mixture, a rosin acid and an alpha-beta unsaturated polycarboxylic acid, the amount of the said alpha-beta unsaturated polycarboxylic acid employed in the resin being equivalent to an amount of maleic anhydride of between about 1% and about 9% by weight of the said rosin acid, and the rosin and polycarboxylic acid groups being substantially completely esterified.

19. A resin comprising a hard, stable, oil-soluble ester of a mixture of polypentaerythritols with pentaerythritol in which the quantity of polypentaerythritols is about 25% by weight of the said mixture, a rosin acid and maleic acid, the maleic acid employed in the resin being in an amount equivalent to a quantity of maleic anhydride between about 1% and about 9% by weight of the rosin acid, and the rosin and maleic acid groups being substantially completely esterified.

GILBERT R. ANDERSON.